July 31, 1956  S. B. CLARK  2,756,772
PRESSURE OPERATED VALVE
Filed Feb. 16, 1953  3 Sheets-Sheet 1
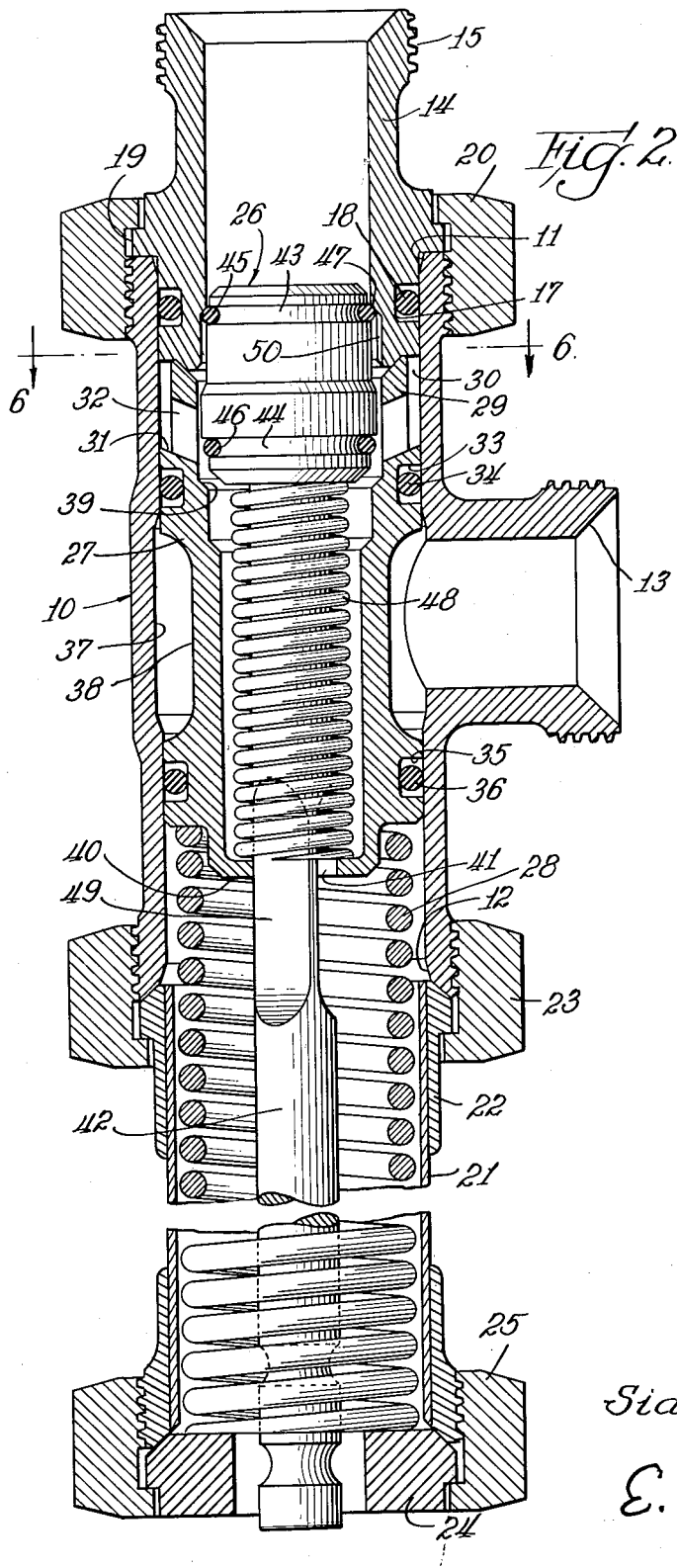

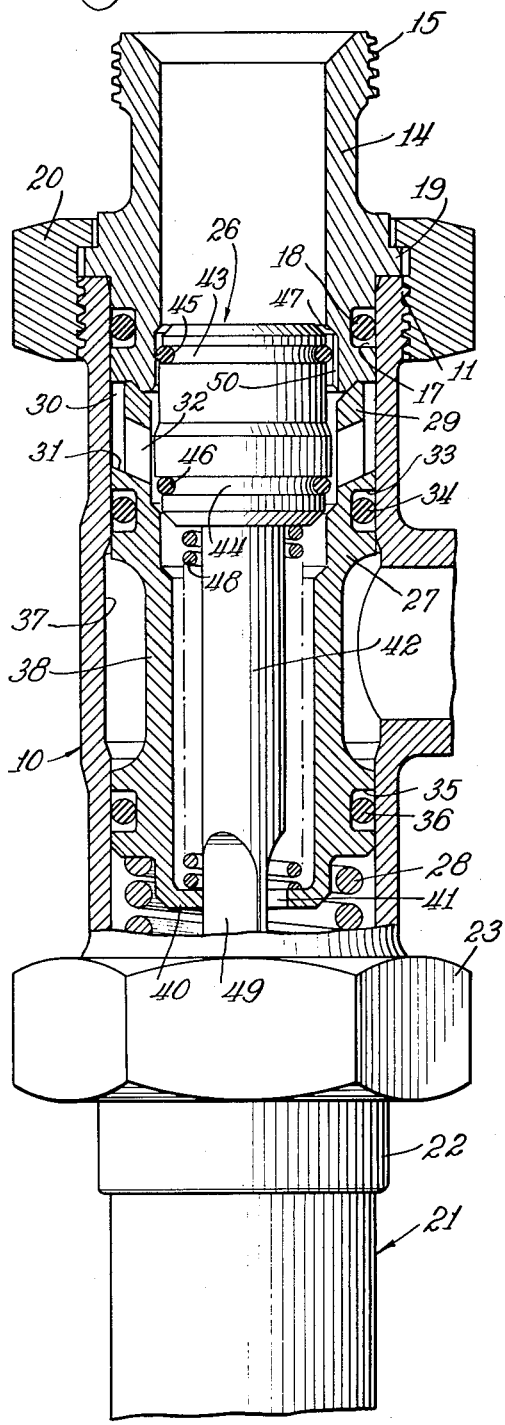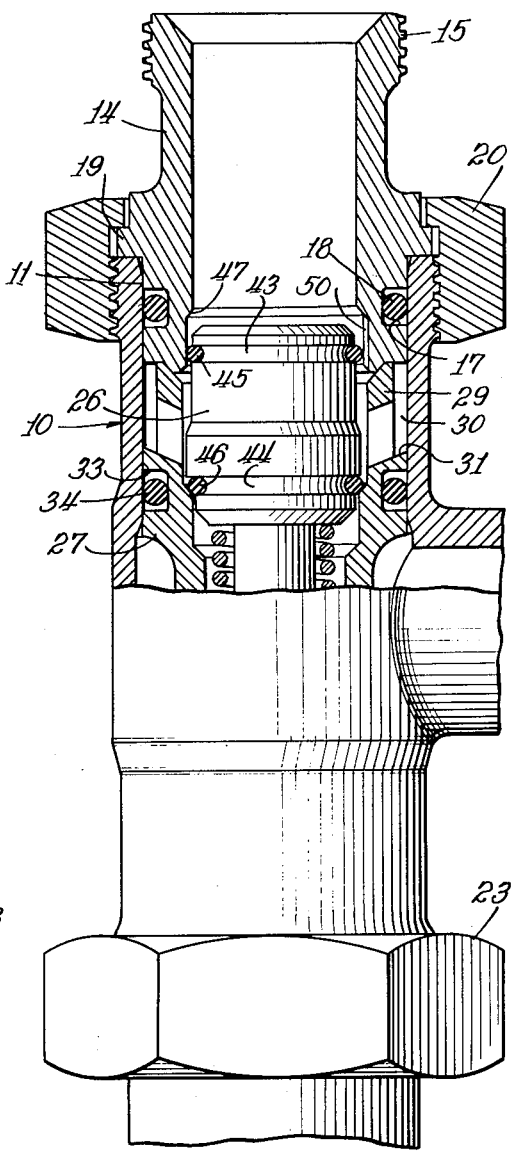

July 31, 1956  S. B. CLARK  2,756,772
PRESSURE OPERATED VALVE

Filed Feb. 16, 1953  3 Sheets-Sheet 3

INVENTOR.
Sidney B. Clark
BY
E. Manning Giles
Atty.

United States Patent Office 2,756,772
Patented July 31, 1956

2,756,772

PRESSURE OPERATED VALVE

Sidney B. Clark, Cedar Rapids, Iowa, assignor to Cherry-Burrell Corporation, Chicago, Ill., a corporation of Delaware Application February 16, 1953, Serial No. 337,045

4 Claims. (Cl. 137—506)

My invention relates to a double-acting pressure-operated valve and has reference more particularly to a sanitary valve for supplying milk or other fluid to a low pressure processing chamber wherein the valve is adapted initially to bleed any trapped air from the supply line and where a predetermined pressure is required before the milk or other fluid is admitted to the processing chamber.

This valve is intended primarily for use with vacuum-steam pasteurizers such as those of the "Vacreator" type, although it will of course be understood that this valve is suitable for use with other types of equipment and its utility is not limited to vacuum-steam pasteurizers.

In connection with this type of pasteurizer, it is important not only to adhere to the strictest sanitary standards but also to make the operation of the supply valve for the raw milk substantially foolproof so that if it should happen to be assembled improperly or if some irregular condition were present the milk would not be permitted to leak into the low pressure processing chamber to which the herein disclosed valve is adapted to supply the milk. Valves have been available heretofore which afforded some desirable safeguards but, owing to the difficulty of preventing product leakage into the low pressure zone, they have not met fully the severe requirements for valves to be used in supplying raw milk to vacuum type pasteurizers.

The principal objects of my invention are to provide a pressure-operated valve which will form an airtight seal at the inlet and avoid leakage through the outlet notwithstanding greatly reduced pressure beyond the outlet; to design such a valve which will insure the bleeding of any air trapped in the supply line before permitting the flow of liquid through the valve outlet; to produce a valve of this type which will prevent leakage of fluid through the outlet even when the valve has been assembled improperly and when components have been omitted; to develop such a valve which requires a predetermined pressure at the inlet in order to operate and which will shut off positively when the pressure drops below that minimum; to insure that any liquid in the valve when it closes will drain out of the valve and will not be permitted to escape through the outlet into the low pressure processing chamber; to provide such a valve having its inlet at the top side thereof, and in general to design an improved pressure-operated valve having high operating efficiency and which can be manufactured economically, these and other objects being accomplished as hereinafter described, reference being had to the accompanying drawings in which Fig. 1 is an external view in reduced size of a pressure-operated valve embodying my invention interposed between a supply pump and processing apparatus;

Fig. 2 is an enlarged sectional view showing the valve of Fig. 1 in closed position;

Fig. 3 is a view similar to Fig. 2 partly in section showing the valve opened sufficiently to by-pass air trapped in the supply line;

Fig. 4 is a view similar to Figs. 2 and 3, partly in section, showing the piston portion of the valve in open position and the valve sleeve portion in closed position;

Fig. 6 is a sectional view on the line 6—6 of Fig. 2.

Figure 5:
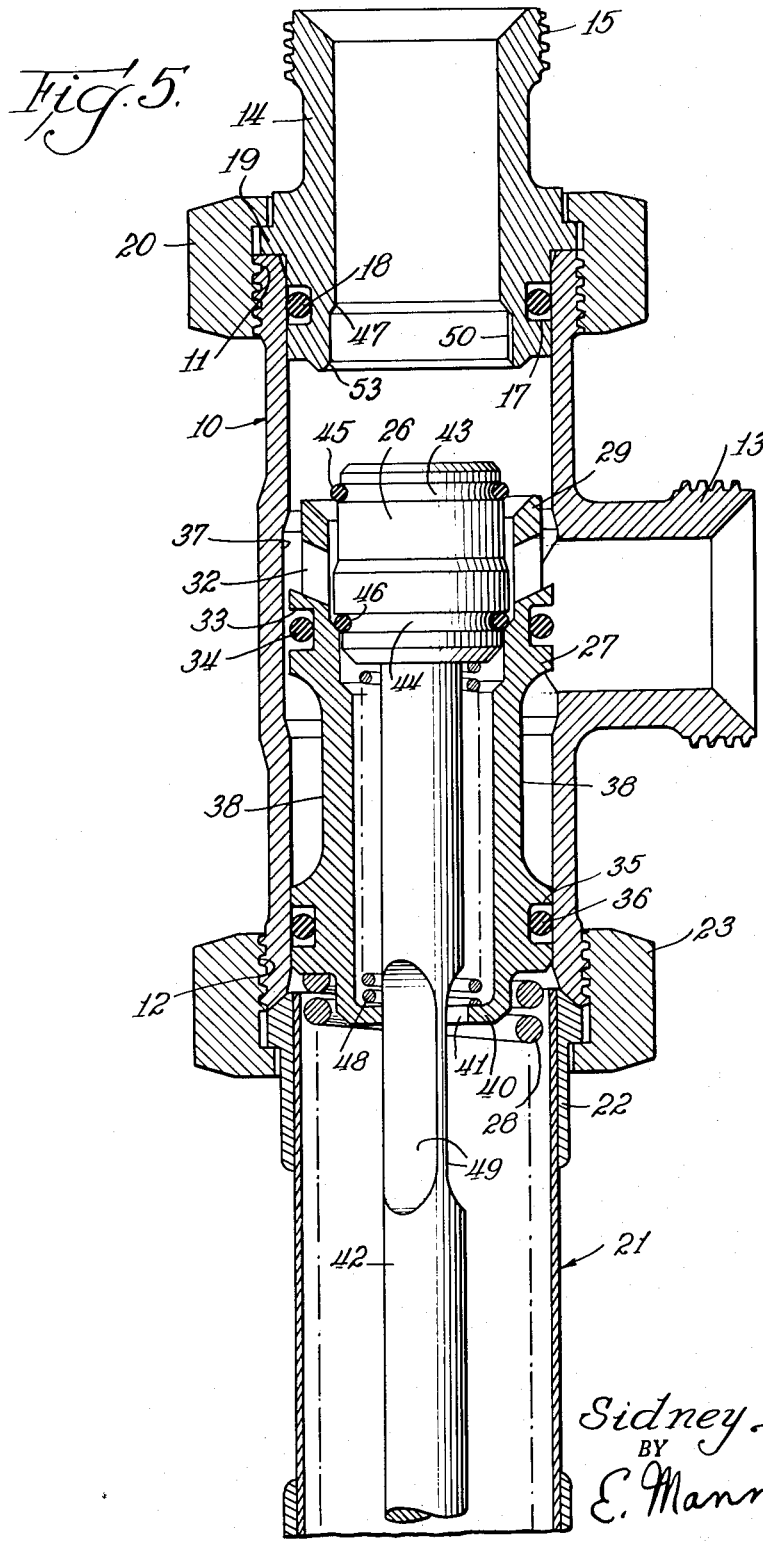
Fig. 5 is a sectional view, similar to Figs. 2, 3, and 4, showing the valve in full open position.

Referring now to the drawings, the pressure-operated valve embodying my invention has a substantially cylindrical body portion designated generally by the reference numeral 10, said valve body 10 having an externally threaded opening 11 and a corresponding threaded opening 12 at opposite ends thereof, and a central externally threaded outlet 13 at one side of the valve body 10.

The valve body 10 is provided with a fitting 14 which serves as the valve inlet and comprises a substantially cylindrical member having an external threading 15 at one end for connection to a product supply line 16 as shown in Fig. 1, and an external annular channel 17 adjacent the opposite end thereof, the channeled end being received within the opening 11 and being provided with an O-ring 18 of neoprene or other resilient material compressed between said channel 17 and the inner wall of the valve body 10 to provide a liquid tight seal. The fitting 14 is provided with an external annular flange 19 spaced from the annular channel 17 and adapted to seat upon the opening 11 and to be held in position thereon by a union nut 20 as shown in Fig. 2.

At its opposite end, the valve body 10 has a substantially cylindrical valve extension 21 which is provided with an externally flanged union ferrule 22 at one end for being held in engagement with the opening 12 by means of a union nut 23 as shown in Fig. 2. At its opposite end the valve extension 21 has a drain cap 24 secured thereto by a union nut 25.

The valve assembly is of a double-acting type and comprises the combination of a piston 26 and a cooperating valve sleeve 27. The valve sleeve 27, which is substantially tubular in form, is mounted within the valve body 10 and, in closed position, the upper end of the valve sleeve 27 is sloped inwardly toward the interior of said valve sleeve 27 to provide a funneling effect for liquid drainage and said upper end of the valve sleeve 27 is adapted to seat against the fitting 14 as shown in Fig. 2 and to be retained in that position by means of a coil spring 28 which is interposed between the lower end of the valve sleeve 27 and the drain cap 24, the lower end of said valve sleeve 27 being provided with a suitable annular seat as shown.

At its upper end, the valve sleeve 27 has a neck portion 29 of reduced outside diameter so as to provide an annular space 30 between said neck portion 29 and the inside wall of the valve body 10. The peripheral flange 31 of the valve sleeve 27 at the base of the neck 29 is sloped inwardly to produce more or less of a gutter effect and four corresponding sloping ports 32, spaced aproximately 90 degrees apart around the neck 29 are adapted to drain any liquid which may accumulate on the peripheral flange 31 into the interior of the valve sleeve 27.

Immediately below the peripheral flange 31, the valve sleeve 27 has an outwardly facing annular channel 33 with an O-ring 34 seated therein and a corresponding annular channel 35 is located near the lower end of the valve sleeve 27 and is similarly provided with an O-ring 36 to seal the respective ends of said valve sleeve 27 against leakage of liquid therepast.

The valve body has an internal annular enlargement 37 so that when the valve sleeve 27 is retracted sufficiently for the upper O-ring 34 to be encircled thereby, there is sufficient clearance between said O-ring 34 and the inner walls of the enlargement 37 to permit liquid to flow past said O-ring 34. The valve sleeve 27 is also provided with a broad, external circumferential concavity 38 which is of substantially the same width as the aforesaid internal annular enlargement 37 and said enlargement 37 and concavity 38 cooperate to provide a fluid flow space therebetween in certain stages of the operation of the valve.

The portion of the valve sleeve 27 within the neck 29 is adapted to receive the piston 26 and a tapered annular seat 39 is provided on the inner wall of said valve sleeve 27 immediately below the ports 32. At its lower end, the valve sleeve 27 has an end wall 40 with a central opening 41 therethrough adapted to receive a stem 42 with which the piston 26 is provided.

The piston 26 is provided with annular O-ring recesses 43 and 44 adjacent the respective ends thereof and each of said recesses 43 and 44 has O-rings 45 and 46, respectively, seated therein. The upper O-ring 45 is adapted to bear against an annular shoulder 47 on the interior wall of the fitting 14. The lower O-ring 46 is adapted to bear against the tapered annular seat 39 on the inner wall of the valve sleeve 27 as shown in Fig. 4. The depending stem 42 is encircled by a coil spring 48, said coil spring 48 being interposed between the bottom of the piston 26 and the end wall 40 of the valve sleeve 27 so that it tends to sustain the piston 26 in a closed position seated on the annular shoulder 47 as shown in Fig. 2. Preferably the coil spring 48 should exert a force equal to about 10 pounds per square inch against the piston 26 so that a pressure in excess of 10 pounds per square inch would be required to displace the piston 26.

Where the stem 42 passes through the opening 41 in the end wall 40, said stem 42 is provided with milled portions 49 extending both above and below the end wall 40 so that any liquid which might accumulate in the valve sleeve 27 may drain through said opening 41 and down through the valve extension 21 and the drain cap 24.

The inner wall of the fitting 14 is provided with a longitudinal air by-pass 50 which is milled to a depth of approximately one-sixteenth of an inch and extends from the annular shoulder 27 to the bottom of the fitting 14 so that when the piston 26 is retracted from the annular shoulder 47, the air by-pass 50 affords communication past the O-ring 45. The milled by-pass 50 is clearly shown in Fig. 6 of the drawing. The fitting 14 is chamfered at its lower end as shown at 53 in Fig. 5 to facilitate movement of the O-ring 45 therepast.

A coil spring 28, which is interposed between valve sleeve 27 and the drain cap 24 and serves to retain the valve sleeve 27 in normally closed position seated against the fitting 14, should exert a greater force than the coil spring 48 so that in operation the piston 26 will open before the valve sleeve 27 is caused to retract. In a preferred embodiment, the coil spring 28 would exert a force of about 15 pounds per square inch. It will be understood, of course, that the O-rings 34 and 36 on the valve sleeve 27 tend to resist movement of said valve sleeve 27 and it has been found that a pressure of about 5 pounds per square inch is required to overcome this resistance to movement. Thus it would require a pressure of about 20 pounds per square inch to overcome both the pressure of the coil spring 28 and the resistance of the O-rings 34 and 36 so as to operate the valve sleeve 27.

As heretofore explained, the pressure operated valve embodying my invention has particular utility in connection with vacuum type processors for milk and other food products where maximum sanitary standards must be maintained and where safeguards are necessary to insure positive flow stoppage and to prevent leakage of fluid into the vacuum processor in the event of improper assembly or malfunctioning of the valve.

Preferably, the valve would be utilized as shown in Fig. 1 with the product supply line 16 connected at one end to a pump 51 and at the other end to the fitting 14 to supply product downwardly into the valve and with the outlet 13 connected to a vacuum processor as indicated by the reference numeral 52.

In operation, the vacuum-steam pasteurizer—or other type vacuum processor—would be started first. As soon as conditions within the vacuum-steam pasteurizer 52 were proper for processing milk or other fluid food product, the pump 51 would be started. Assuming, as would probably be the case, that there were some air trapped in the product supply line 16 when the pump 51 was started, the air would exert an increasing pressure against the face of the piston 26 until the pressure reached approximately 10 pounds per square inch, at which point the pressure would begin to exceed that of the coil spring 48 and the piston 26 would begin to retract. As soon as it retracted sufficiently to withdraw the O-ring 45 from sealing relation against the shoulder 47, the air by-pass 50 would be exposed as shown in Fig. 2, thus permitting the air to escape therethrough and to pass around the O-ring 46 and the lower end of the piston 26 through the interior of the valve sleeve 27, through the opening 41 in the end wall 40 thereof, through the valve extension 21, and out through the drain cap 24. The air by-pass 50 is of sufficient size to permit trapped air to escape, but it is not adequate to pass liquid in the volume at which it is supplied by the pump 51. Thus when the milk or other liquid in the supply line 16 reaches the piston 26, it forces said piston 26 to retract as far as it will go—that is, to the position shown in Fig. 4 with the O-ring seated in liquid sealing relation on the annular seat 39. In this position, the piston 26 seals off the interior passage through the valve sleeve 27 and the O-ring 34 surrounding the valve sleeve 27 prevents passage of liquid therepast. Thus, as the pump 51 continues to operate the pressure of the product in the supply line 16 rapidly increases to 20 pounds or more per square inch which is sufficient to force the valve sleeve 27 and the piston 26 to retract concurrently to approximately the position shown in Fig. 5, in which position the liquid can enter the outlet 13. In this manner, after the air has been bled from the supply line 16, the liquid is supplied at a predetermined pressure through the outlet 13 to the vacuum-steam pasteurizer 52.

If the pressure of the liquid is reduced, either by accident or because the pump 51 is shut off, the pressure of the coil spring 28 forces the valve sleeve 27 back into the position shown in Figs. 2, 3, and 4, and the pressure of the coil spring 48 on the piston 26 causes the latter to return rapidly to the position shown in Fig. 2. It is important to note that as soon as the valve sleeve 27 returns to its normally closed position, all liquid and air access to the outlet 13 is shut off by the sealing effect of the O-rings 34 and 36, above and below said outlet 13. Any liquid which may remain in the annular space 30 surrounding the neck 29 of the valve sleeve 27 when the latter is reseated in its normally closed position will flow down through the ports 32 into and down through the interior of the valve sleeve 27 then down through the valve extension 21, and will drain out through the drain cap 24.

For sanitary reasons, it is essential that any accumulated liquid in the supply line 16 be prevented from leaking into the vacuum-steam pasteurizer 52 when the pump 51 is shut off, even if one or more of the O-rings 34, 36, 45, and 46 are faulty or have been omitted from the assembly of the valve. The valve herein described meets this requirement. Thus if the O-ring 45 is faulty or has been omitted, the liquid will flow down around the piston 26 into the interior of the valve sleeve 27 and out through the bottom of the valve. The inward slope at the top of the valve sleeve 27 assures drainage into the interior thereof. Since the O-ring 46 is inoperative when the valve is closed, its omission would have no effect.

If the O-ring 34 near the top of the valve sleeve 27 were omitted, the liquid would still flow as just described into the interior of the valve sleeve 27 and any liquid around the neck 29 of the valve sleeve 27 would drain into its interior through the ports 32. Owing to the fact that the valve is open at the bottom and the air within the valve would be at atmospheric pressure, if either of the O-rings 34 or 36 were omitted there would be a leakage of air through the outlet 13 into the low pressure area within the vacuum-steam pasteurizer 52. In view of the design features as heretofore described, however, drainage of any leaking fluid in the valve would be out through the valve sleeve 27, and, accordingly, if there were an omission or malfunctioning of the O-rings 34 and 36, there would be no liquid at the places where air leakage would occur. Thus air only would be drawn into the vacuum-steam pasteurizer 52. While this would interfere with proper functioning of the vacuum-steam pasteurizer 52, it would not permit any liquid product to be drawn from the valve into the pasteurizer.

While I have described the double-acting valve embodying my invention and a particularly advantageous manner in which it can be utilized, it is to be understood that it can be used to advantage with other apparatus and can be modified readily to be adapted to other applications as will be apparent to those skilled in the art, and such modifications can be made without departing from the spirit of my invention, the scope of which is to be determined by the appended claims.

I claim:

1. A double-acting valve of the class described comprising a valve body having a chamber therein, a valve sleeve reciprocably disposed within said valve body chamber and a valve member telescopically engaged within said valve sleeve, said valve body having an inlet port communicating with said chamber and an outlet port spaced therefrom and also communicating with said chamber, said valve body chamber having a peripheral shoulder surrounding said inlet port, said valve sleeve being adapted to engage said peripheral shoulder and being provided with resilient means for urging said valve sleeve into such engagement, said valve member being provided with resilient means for supporting the valve member in normally protruding relation with respect to said valve sleeve so that when the valve sleeve engages the aforesaid peripheral shoulder the valve member projects into engagement with said inlet port, said valve sleeve having a portion which, when the valve sleeve is in full extended position, is disposed between the peripheral shoulder and the outlet port and is of sufficient lateral dimension to prevent liquid flow between said peripheral shoulder and the outlet port, and said valve sleeve being adapted to retract sufficiently when subjected to predetermined liquid pressure from said inlet port, to expose a portion of said outlet port to liquid flow from said inlet port.

2. A double-acting valve of the class described comprising the combination of an elongated valve body having a longitudinal chamber therein, a sleeve reciprocably mounted therein, and a cooperating piston retractably mounted in said sleeve, said valve body having an inlet port at one end thereof, the valve body being provided with internal sleeve and piston seats adjacent said inlet port, and having an outlet port at a side thereof spaced from said inlet port and adapted to be straddled by said sleeve in its closed position, yieldable means being provided in said chamber to urge said sleeve into normally closed position to engage the sleeve seat, the sleeve being retractable to permit communication between the inlet and outlet ports, and yieldable means being provided in said sleeve to urge said piston into normally closed position to engage the piston seat.

3. A double-acting valve of the class described comprising the combination of an elongated valve body having a longitudinal chamber therein, a sleeve reciprocably mounted therein, and a cooperating piston retractably mounted in said sleeve, said valve body having an inlet port at one end thereof, the valve body being provided with internal sleeve and piston seats adjacent said inlet port, and having an outlet port at a side thereof spaced from said inlet port and adapted to be straddled by said sleeve in its closed position, yieldable means being provided in said chamber to urge said sleeve into normally closed position to engage the sleeve seat, the sleeve being retractable to permit communication between the inlet and outlet ports, and yieldable means being provided in said sleeve to urge said piston into normally closed position to engage the piston seat, the yieldable means for said piston being relatively more yieldable than the yieldable means for said sleeve.

4. A double-acting valve of the class described comprising the combination of an elongated valve body having a longitudinal chamber therein, a sleeve reciprocably mounted therein, and a cooperating piston retractably mounted in said sleeve, said valve body having an inlet port at one end thereof, the valve body being provided with internal sleeve and piston seats adjacent said inlet port, and having an outlet port at a side thereof spaced from said inlet port and adapted to be straddled by said sleeve in its closed position, yieldable means being provided in said chamber to urge said sleeve into normally closed position to engage the sleeve seat, the sleeve being retractable to permit communication between the inlet and outlet ports, and yieldable means being provided in said sleeve to urge said piston into normally closed position to engage the piston seat, the yieldable means for said piston being relatively more yieldable than the yieldable means for said sleeve, said inlet port being provided with a recessed passage which when said piston is slightly retracted from its normally closed position provides communication therearound.

References Cited in the file of this patent

UNITED STATES PATENTS

| | | |
|---|---|---|
| 823,805 | McGonagle | June 19, 1906 |
| 1,050,724 | Emory | Jan. 14, 1913 |
| 2,335,829 | McBride | Nov. 30, 1939 |
| 2,575,944 | Conner | Nov. 20, 1951 |

FOREIGN PATENTS

| | | |
|---|---|---|
| 515,231 | Great Britain | Nov. 29, 1939 |